United States Patent
Chang

(10) Patent No.: US 7,681,900 B2
(45) Date of Patent: Mar. 23, 2010

(54) QUICK RELEASE STRUCTURE FOR A BICYCLE

(75) Inventor: Tai-Shan Chang, Taiping (TW)

(73) Assignee: Ming Cycle Industrial Co., Ltd., Taichung Hsien (TW)

( * ) Notice: Subject to any disclaimer, the term of this patent is extended or adjusted under 35 U.S.C. 154(b) by 147 days.

(21) Appl. No.: 12/047,362

(22) Filed: Mar. 13, 2008

(65) Prior Publication Data

US 2009/0026726 A1    Jan. 29, 2009

(30) Foreign Application Priority Data

Jul. 28, 2007    (GB) ................... 0714755.6

(51) Int. Cl.
  *B62K 15/00*    (2006.01)
  *B62K 19/18*    (2006.01)
(52) U.S. Cl. .................................. 280/287; 280/278
(58) Field of Classification Search ............ 280/278, 280/287
  See application file for complete search history.

(56) References Cited

U.S. PATENT DOCUMENTS

| | | | | |
|---|---|---|---|---|
| 4,566,713 A | * | 1/1986 | Hon | ........................... 280/287 |
| 5,312,125 A | * | 5/1994 | Tsao | ........................... 280/287 |
| 6,581,492 B1 | * | 6/2003 | Chen | ........................... 74/551.3 |
| 6,886,845 B2 | * | 5/2005 | Chao | ........................... 280/278 |
| 2002/0063411 A1 | * | 5/2002 | Feng | ........................... 280/278 |
| 2004/0239072 A1 | * | 12/2004 | Chou | ........................... 280/287 |
| 2005/0035570 A1 | * | 2/2005 | Chu | ........................... 280/278 |

* cited by examiner

*Primary Examiner*—Lesley Morris
*Assistant Examiner*—Marc A Scharich
(74) *Attorney, Agent, or Firm*—Banger Shia

(57) ABSTRACT

A quick release structure for a bicycle comprises a positioning post and an engaging member. The positioning post and the engaging member are disposed on the two tubes of the bicycle, respectively. The positioning post includes a stopping block and a spring. When the positioning post is inserted into the engaging member, the stopping block can be used together with the spring to restrict the positioning post in the engaging member, so that the two tubes of the bicycle can be assembled. When the stopping block is pressed, the positioning post can disengage from the engaging member. Hence, the quick release structure for a bicycle can be quickly assembled and disassembled.

4 Claims, 9 Drawing Sheets

QUICK RELEASE STRUCTURE FOR A BICYCLE

BACKGROUND OF THE INVENTION

1. Field of the Invention

The present invention relates to a bicycle, and more particularly to a quick release structure for a bicycle.

2. Description of the Prior Art

Conventional bicycle quick release structures are mainly pressing type structures. A pressing handlebar and a pressed member are disposed on two tubes of the bicycle that are to be assembled. With the pressing handlebar and the pressed member, the two tubes can be connected with each other. For example, a quick release structure with a safety device disclosed in Taiwan Pat. No. 090204992 is a pressing type quick release structure.

However, it is inconvenient for this conventional pressing type quick release structure to be assembled or disassembled because, during the assembly operation, the pressing handlebar must be engaged with the pressed member first, the pressing handlebar can be pulled to press against the pressed member to assemble the two tubes; during the disassembly operation, the pressing handlebar must be first pulled to release the pressed member, thereafter the two tubes can be disconnected. With at least two procedures of engaging and pulling, this conventional pressing type quick release structure can only be assembled or disassembled with a degree of inconvenience.

The present invention has arisen to mitigate and/or obviate the afore-described disadvantages.

The primary object of the present invention is to provide a quick release structure for a bicycle which be assembled and disassembled more rapidly.

SUMMARY OF THE INVENTION

According to the present invention there is provided a quick release structure for a bicycle comprising a positioning post and an engaging member, the positioning post and the engaging member being disposed on two tubes of the bicycle, respectively; wherein the positioning post includes a post body, a spring and a stopping block, the post body includes a groove and a bore, the groove is located at one end of post body and includes a restricting surface, the bore is located in the restricting surface of the groove, the spring is disposed in the bore, the stopping block is formed with a restricting portion and a positioning portion on an outer periphery thereof, the stopping block is pivotally disposed in the groove, a position where the stopping block is pivotally coupled is located between the restricting portion and the positioning portion, the positioning portion is pressed against by the spring to protrude from one side of the post body, the restricting portion is pressed against the restricting surface of the groove; and the engaging member is formed with a through hole for engaging with the positioning post such that, when the positioning post is inserted through the through hole, the positioning portion of the stopping block protrudes out of the post body and is pressed against the engaging member to position it, thus connecting the positioning post and the engaging member.

For the disassembly operation, the stopping block is pressed so that the positioning post and the engaging member can be released. Hence, the quick release structure of the present invention is quite easy and convenient to be assembled and disassembled.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Referring to FIGS. 1-4, a quick release structure for a bicycle in accordance with a preferred embodiment of the present invention is disposed on the two tubes B1, B2 of the bicycle A and comprises a positioning post 10 and an engaging member 20.

Figure 1:
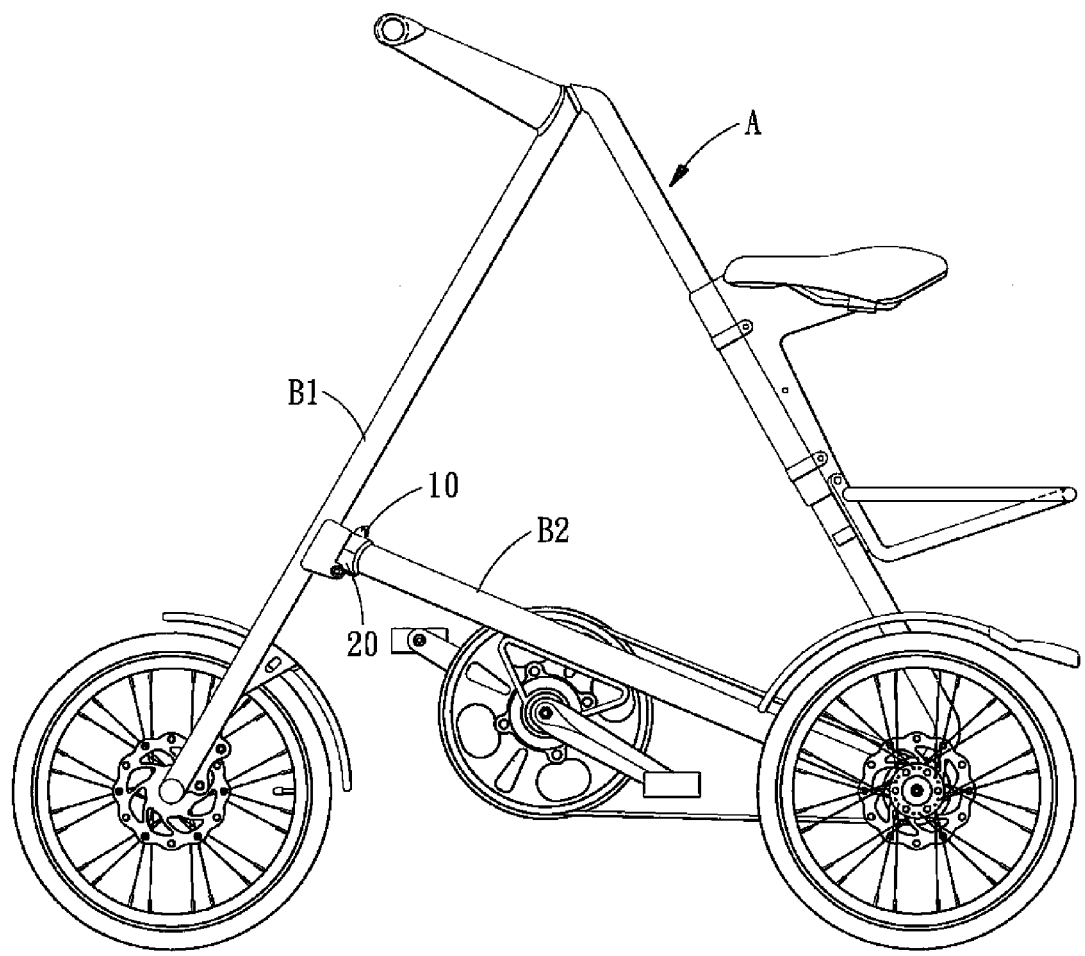
FIG. 1 shows a quick release structure for a bicycle in accordance with the present invention disposed on a bicycle.
Figure 2:
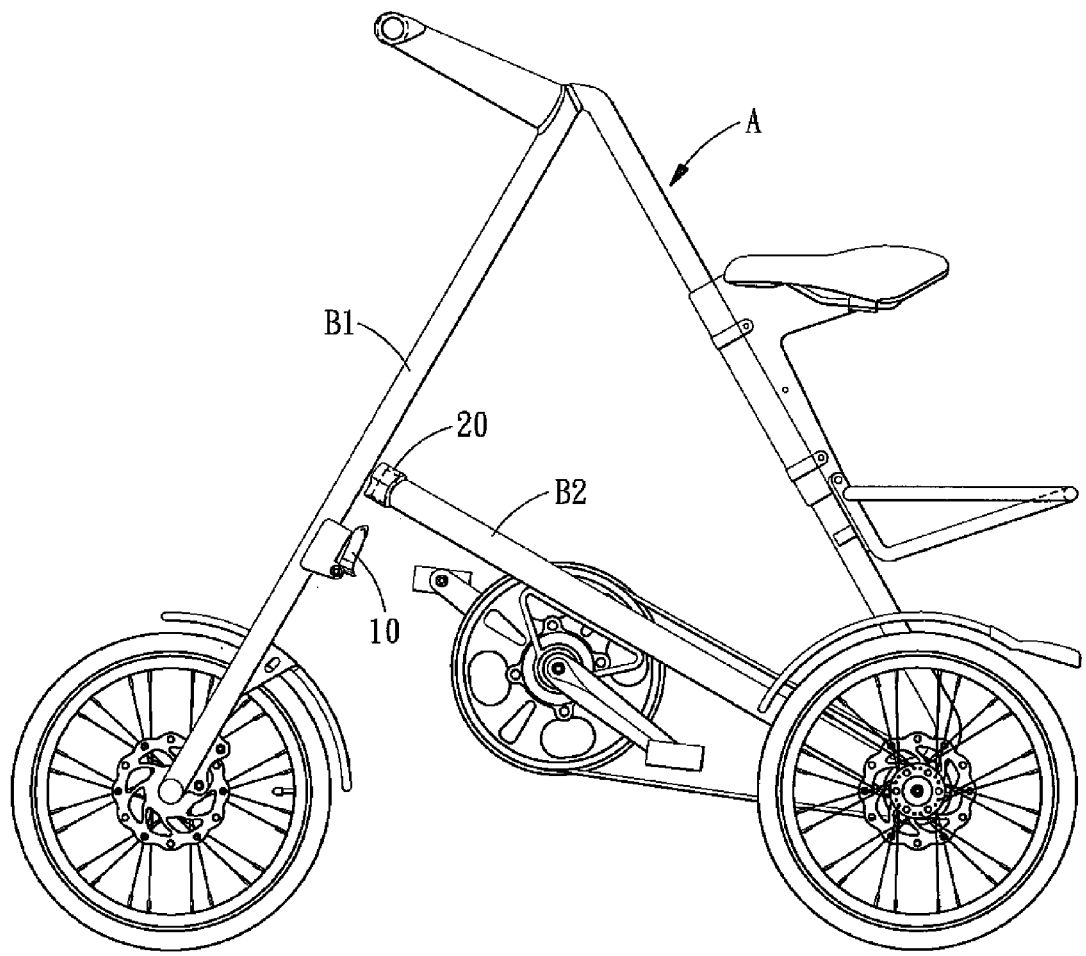
FIG. 2 shows a positioning post and an engaging member of the quick release structure for a bicycle as shown in FIG. 1 when disconnected.
Figure 3:
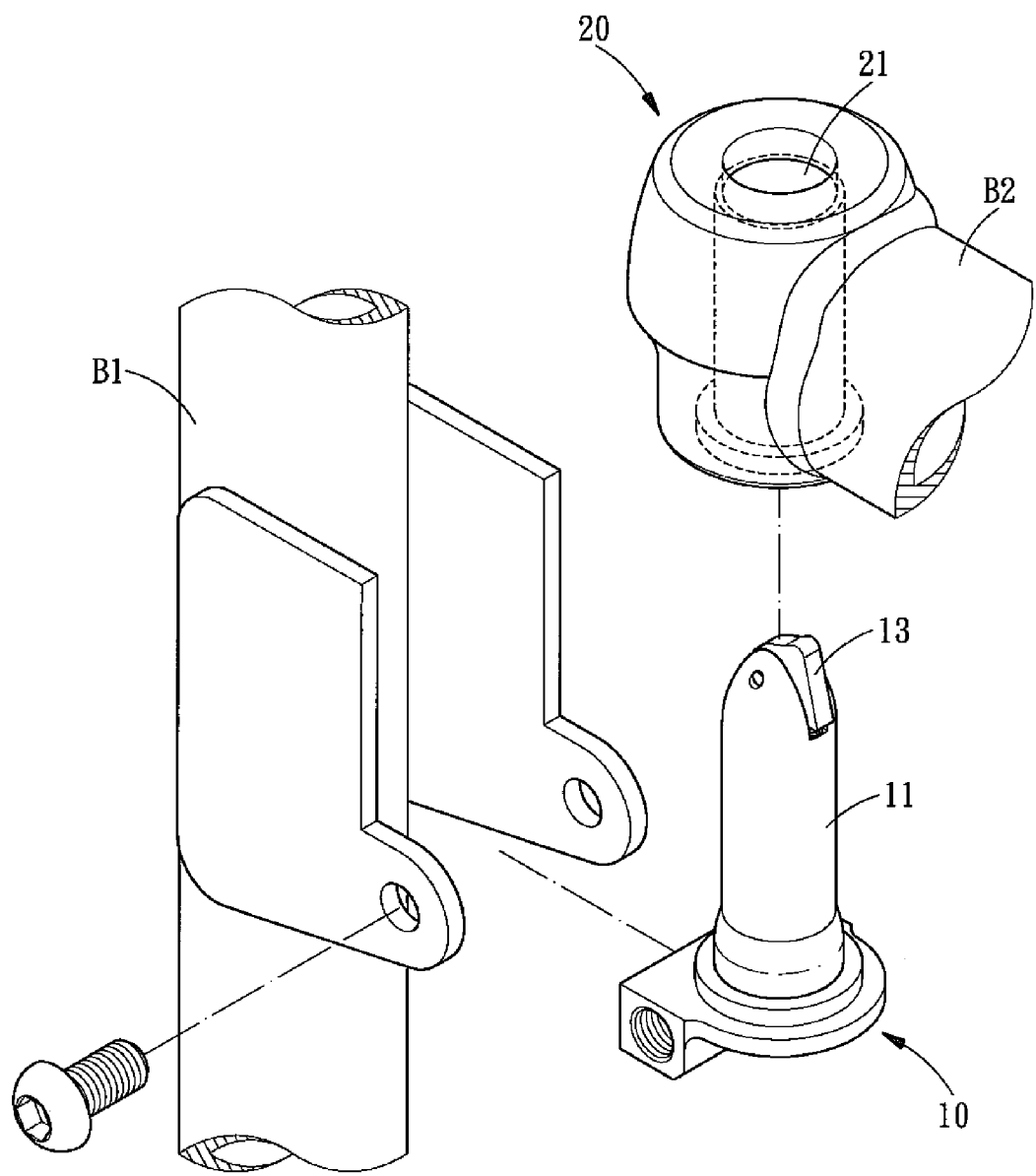
FIG. 3 shows the quick release structure for a bicycle in accordance with the present invention.
Figure 4:
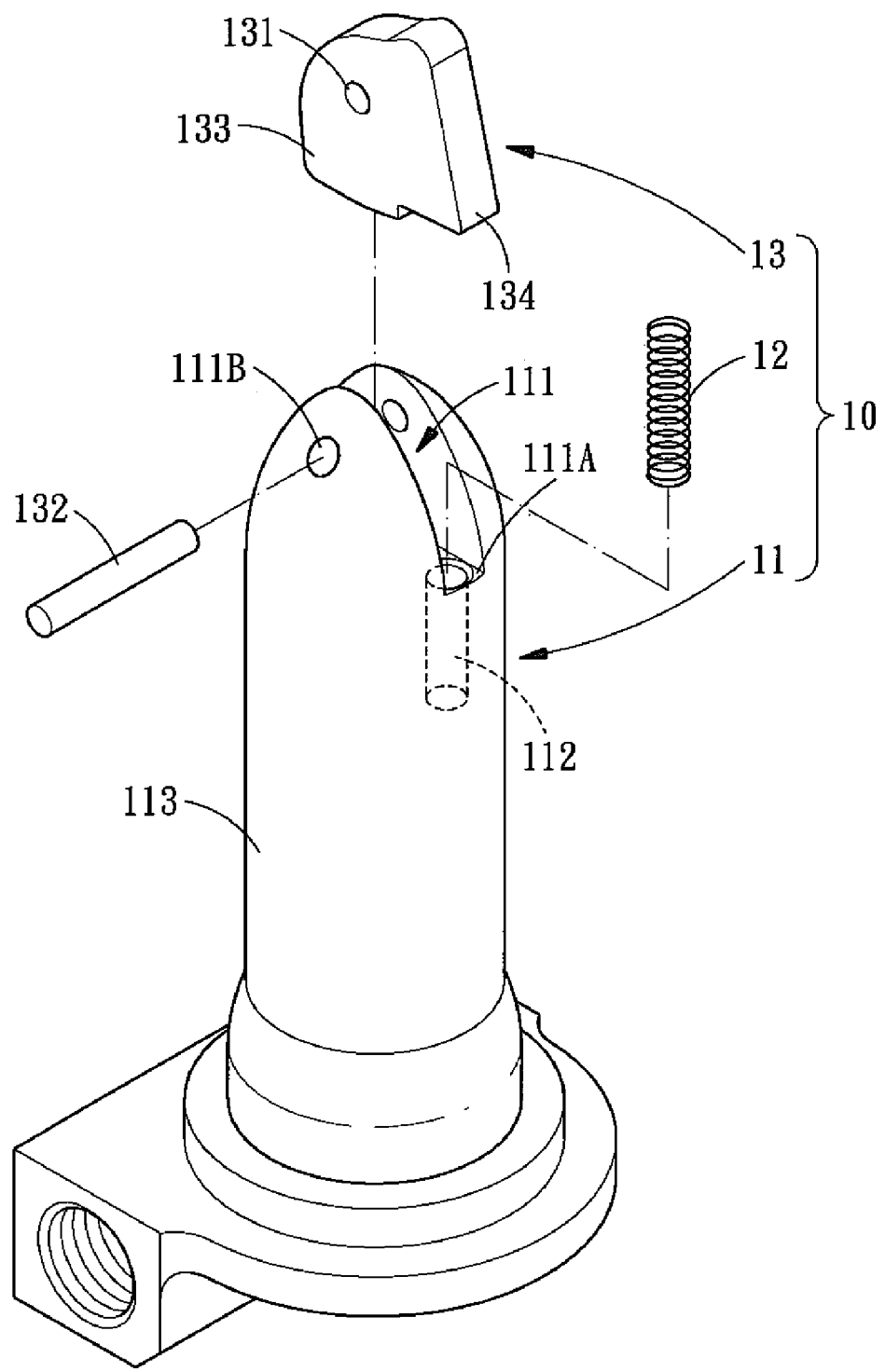
FIG. 4 is an exploded view of the positioning post of the quick release structure.

The positioning post 10 is disposed on the tube B1. As shown in FIG. 4, the positioning post 10 includes a post body 11, a spring 12 and a stopping block 13. The post body 11 is a column-shaped structure, which includes a groove 111 and a 112. The groove 111 is laterally located at one end of the post body 11, and a restricting surface 111A is formed at the bottom of the groove 111. The groove 111 is radially formed with two pivot holes 111B. The spring 12 is disposed in the bore 112. The stopping block 13 includes a pivot hole 131. A pivot pin 132 is inserted into the two pivot holes 111B of the groove 111 and into the pivot hole 131 of the stopping block 13, so that the stopping block 13 is pivotally disposed in the groove 111. The stopping block 13 further includes a restricting portion 133 and a positioning portion 134 on the outer periphery thereof, and the restricting portion 133 and the positioning portion 134 are located one on each side of the pivot hole 131. The positioning portion 134 is acted on by the spring 12 to rotate the stopping block 13, and the restricting portion 134 is pressed against the restricting surface 111A of the groove 111. The positioning portion 134 protrudes from one side 113 of the post body 11.

The engaging member 20 is formed with a through hole for engaging with the positioning post 10.

Figure 5:
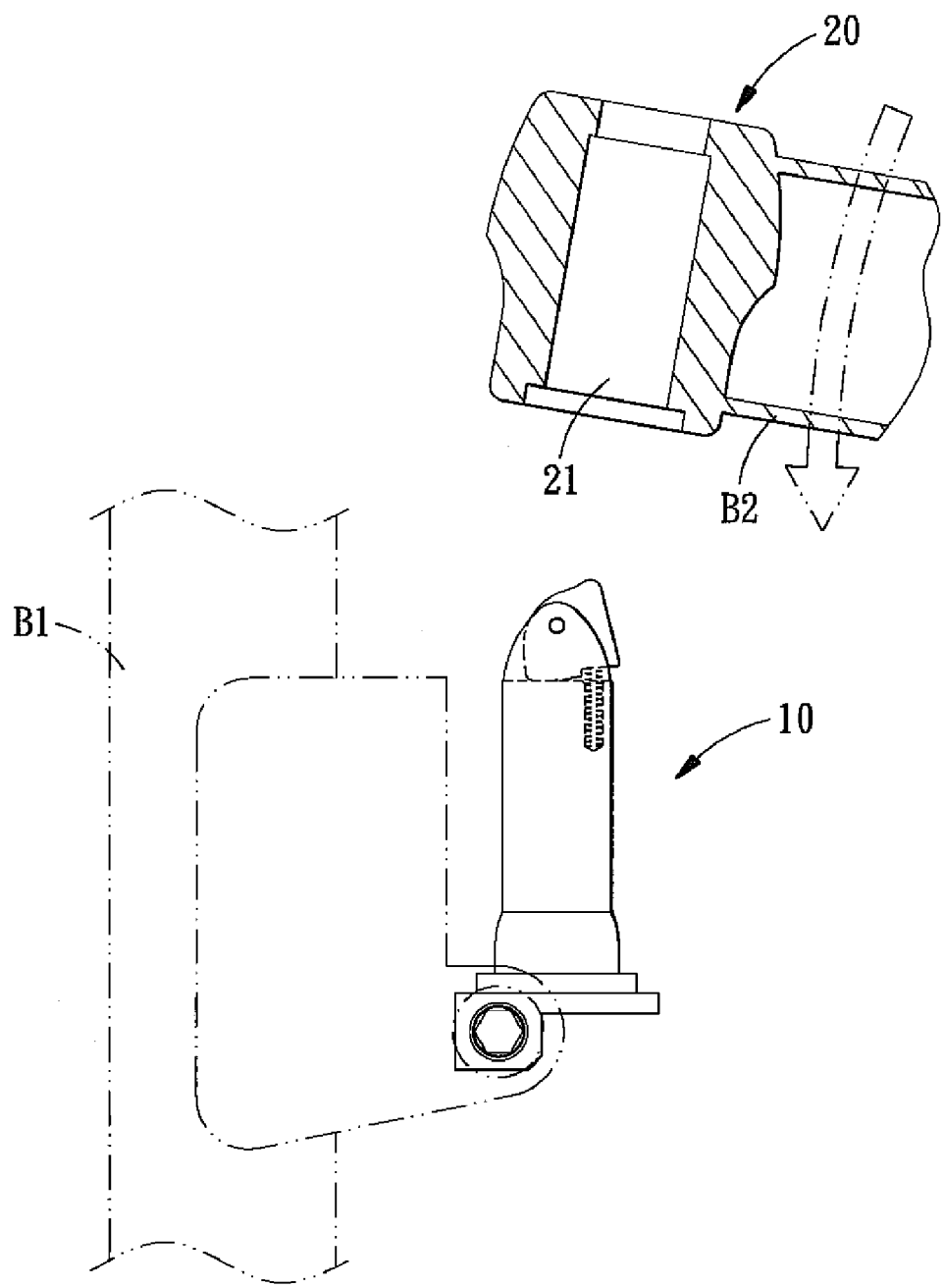
FIG. 5 shows how the positioning post is to be assembled to the engaging member.

When the two tubes B1, B2 of the bicycle A are assembled, as shown in FIG. 5, the tube B2 is moved towards the tube B1.

Figure 6:
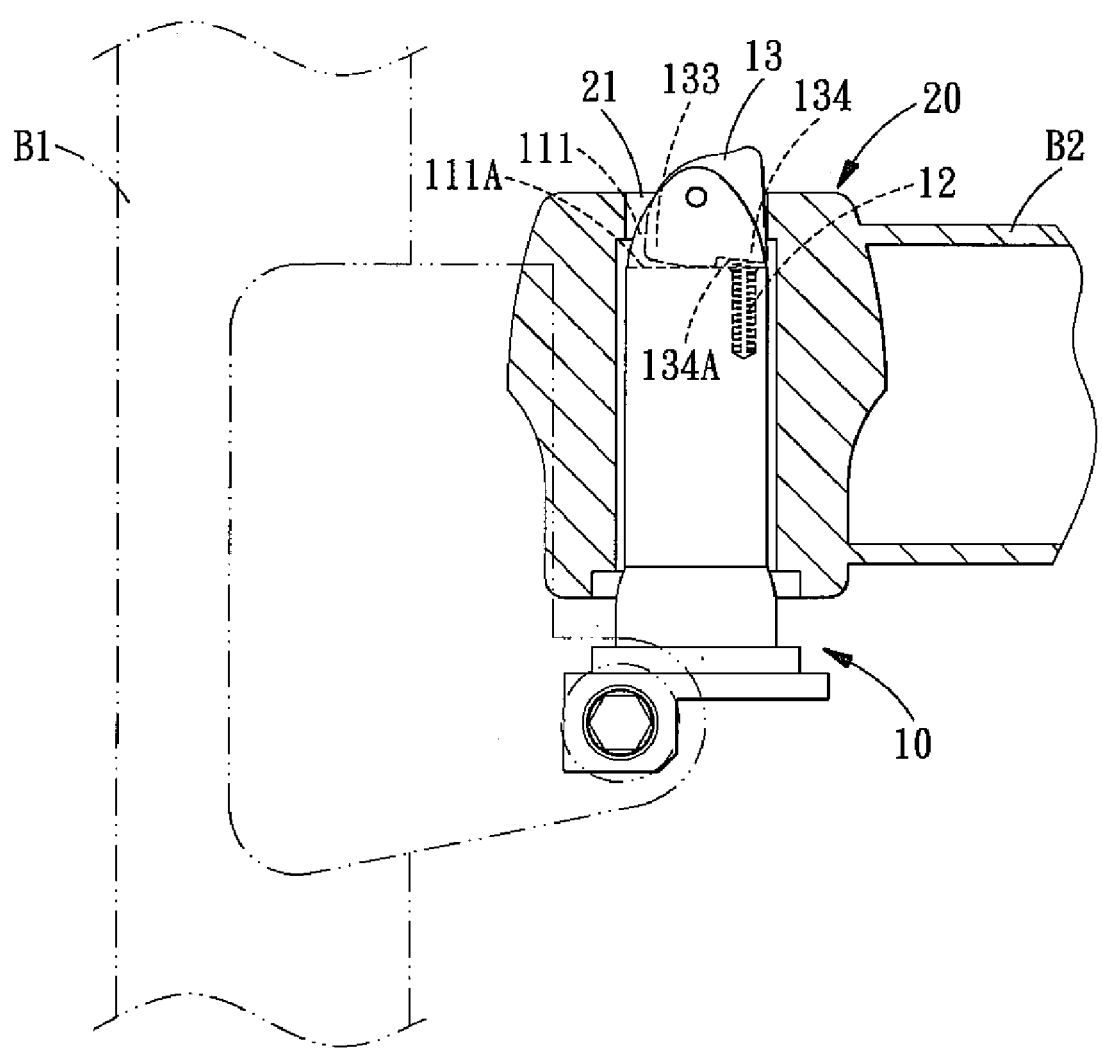
FIG. 6 shows how a stopping block is restricted by the engaging member.

Further referring to FIG. 6, when the positioning post 10 of the tube B1 is inserted through the through hole 21 of the engaging member 20 of the tube B2, the through hole 21 will restrict the positioning portion 134 of the stopping member 13 of the positing post 10, and push the stopping block 13, causing it to rotate to make the positioning portion 134 retract, so that the positioning post 10 can be inserted through the through hole 21. At the same time, the positioning portion 134 will press against the spring 12 by a positioning surface 134A, so that the spring 12 will be compressed, and the restricting portion 133 will be moved away from the restricting surface 111A of the groove 111.

Figure 7:
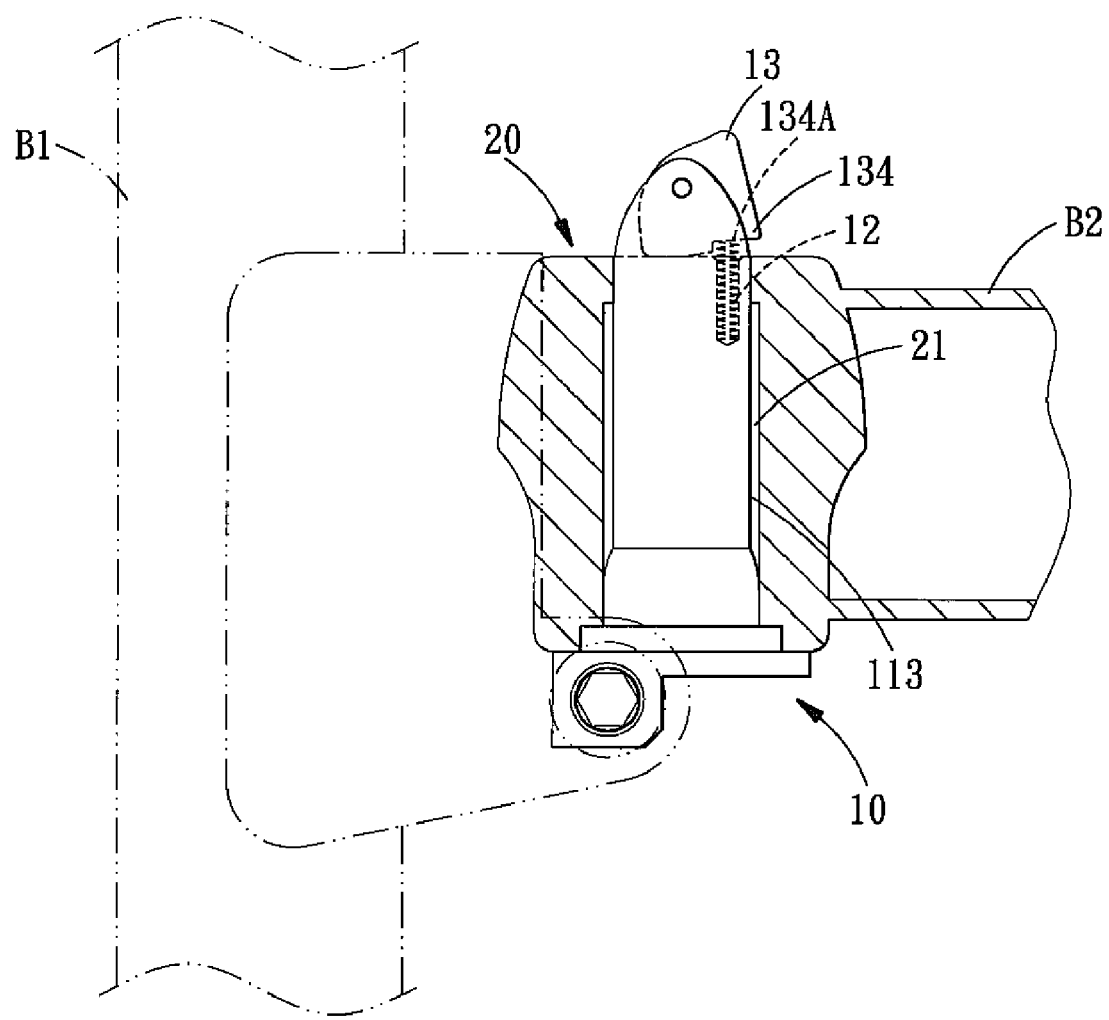
FIG. 7 shows how the positioning post is restricted in the engaging member.

When the positioning post 10 is inserted by a distance such that movement of the stopping block 13 is no longer restricted by the through hole 21, as shown in FIG. 7, the spring 12 will utilize its restoring force to press against the positioning surface 134A of the positioning portion 134 to cause the stopping block 13 to rotate and the positioning portion 134 will protrude from the side 113 of the post body 11. Thereby, the positioning portion 134 can abut against the engaging member 20 to hold the positioning post 10 in the engaging member 20, thus connecting the positioning post 10 and the engaging member 20 and assembling the two tubes B1, B2.

Figure 8:
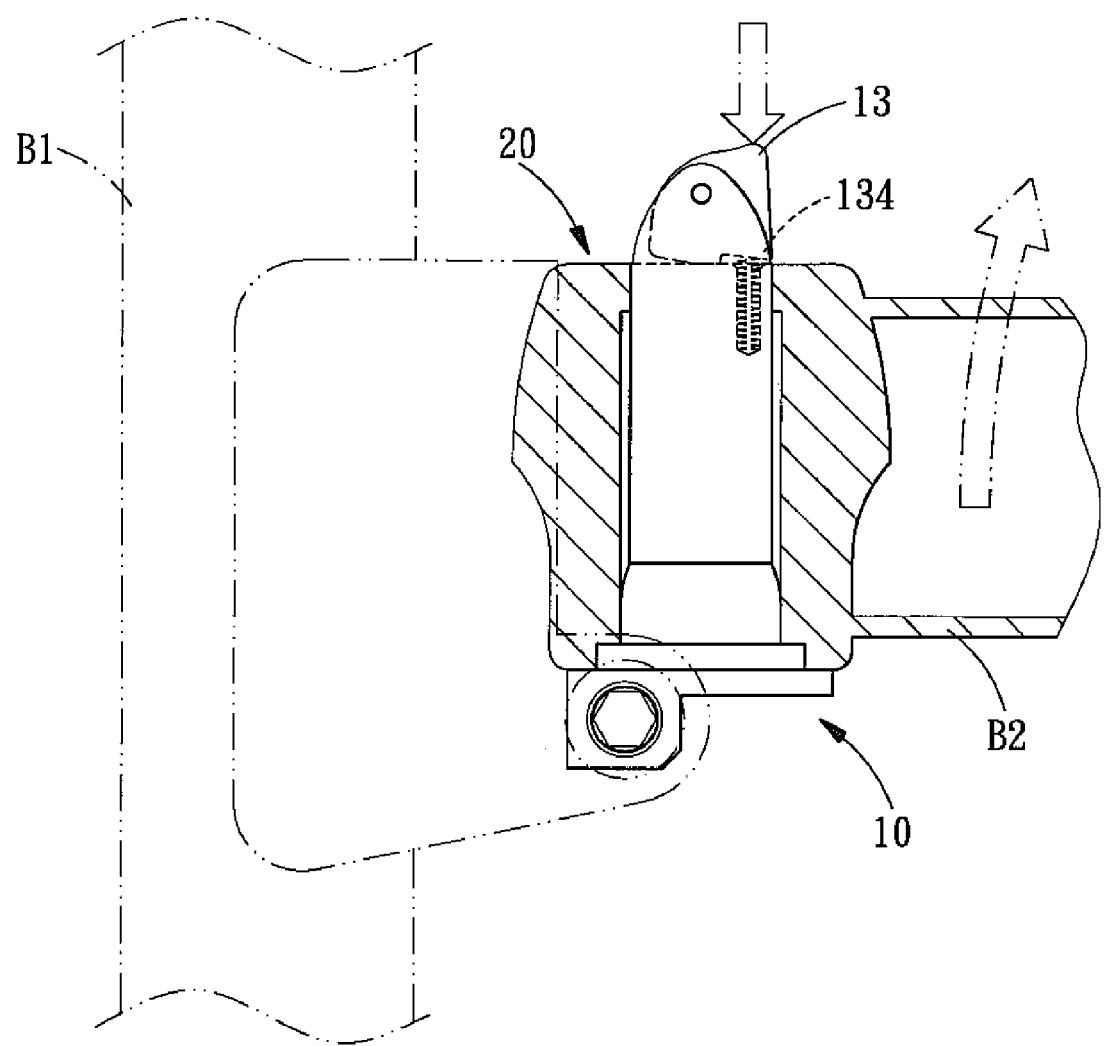
FIG. 8 shows the positioning post when free from the restriction of the engaging member.

When the two tubes are disassembled, as shown in FIG. 8, it is only when the stopping block 13 is forced to rotate to make the positioning portion 134 retract and compress the spring 12 that the positioning post 10 can be released from the engaging member 20.

Figure 9:
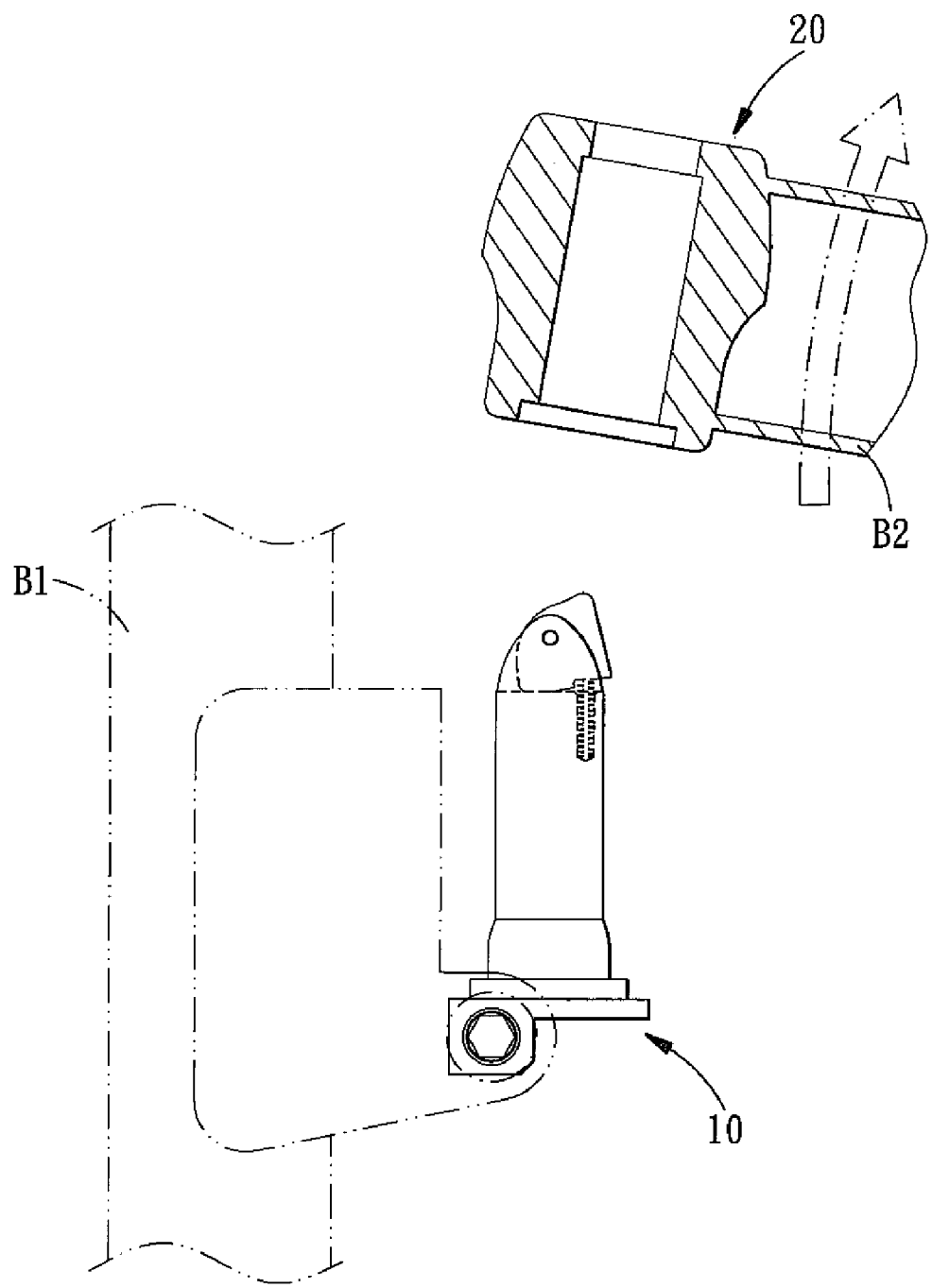
FIG. 9 shows the positioning post disconnected from the engaging member.

Further referring to FIG. 9, the positioning post 10 can be taken out from the engaging member 20 to disassemble the two tubes B1, B2.

As can be seen from the above, when the positioning post 10 is inserted through the through hole 21 of the engaging member 20, the positioning portion 134 of the stopping block 13 will restrict the positioning post 10 and the engaging member 20, so that the two tubes B1, B2 can be assembled. During the disassembly operation, as long as the stopping block 13 is pressed, the positioning post 10 and the engaging member 20 will be released, thus disassembling the two tubes B1, B2. Hence, the quick release structure can be quickly assembled and disassembled.

What is claimed is:

1. A quick release structure for a bicycle comprising: a positioning post and an engaging member, the positioning post and the engaging member being disposed on two tubes of the bicycle, respectively; wherein:
   the positioning post including a post body, a spring and a stopping block, the post body including a groove and a bore, the groove being located at one end of the post body and including a restricting surface, the bore being located in the restricting surface of the groove, the spring being disposed in the bore, the stopping block being formed with a restricting portion and a positioning portion on an outer periphery thereof, the stopping block being pivotally disposed in the groove, and pivotally coupled to the post body at a position located between the restricting portion and the positioning portion, the positioning portion being pressed against by the spring to protrude from one side of the post body, the restricting portion being pressed against the restricting surface of the groove; and
   the engaging member being formed with a through hole for engaging with the positioning post such that, when the positioning post is inserted through the through hole, the positioning portion of the stopping block protrudes out of the post body and is pressed against the engaging member to position it, thus connecting the positioning post and the engaging member.

2. The quick release structure for a bicycle as claimed in claim 1, wherein the post body is a column-shaped structure.

3. The quick release structure for a bicycle as claimed in claim 1, wherein the groove is laterally formed at one end of the post body.

4. The quick release structure for a bicycle as claimed in claim 3, wherein the restricting surface is located at the bottom of the groove.

\* \* \* \* \*